United States Patent
Sellers et al.

(10) Patent No.: US 8,601,523 B2
(45) Date of Patent: Dec. 3, 2013

(54) TOPOGRAPHIC FRAUD DETECTION

(75) Inventors: Michael Sellers, Setauket, NY (US); Robert Zito, Staten Island, NY (US)

(73) Assignee: CSC Holdings, LLC, Bethpage, NY (US)

( * ) Notice: Subject to any disclaimer, the term of this patent is extended or adjusted under 35 U.S.C. 154(b) by 315 days.

(21) Appl. No.: 12/858,877

(22) Filed: Aug. 18, 2010

(65) Prior Publication Data
US 2012/0047545 A1 Feb. 23, 2012

(51) Int. Cl.
*H04N 7/173* (2011.01)

(52) U.S. Cl.
USPC .......................................................... 725/111

(58) Field of Classification Search
USPC .......................................................... 725/111
See application file for complete search history.

(56) References Cited

U.S. PATENT DOCUMENTS

| | | | |
|---|---|---|---|
| 7,502,841 B2 * | 3/2009 | Small et al. | 709/223 |
| 7,869,369 B2 * | 1/2011 | Overcash | 370/241 |
| 2003/0145075 A1 * | 7/2003 | Weaver et al. | 709/223 |
| 2008/0126540 A1 * | 5/2008 | Zeng et al. | 709/225 |
| 2010/0322214 A1 * | 12/2010 | Workman et al. | 370/338 |

* cited by examiner

Primary Examiner — Mulugeta Mengesha
(74) Attorney, Agent, or Firm — Sterne Kessler Goldstein & Fox PLLC

(57) ABSTRACT

Methods and systems to detect topographic fraud are provided herein. The system includes a Cable Modem Termination System (CMTS) to periodically poll active cable modems and generate polling data. The system also includes a processor and a memory coupled to the CMTS. The processor is configured to, based on instructions in the memory, periodically determine a current geographic location for each polled cable modem based on the polling data from the CMTS, determine a geographic radius within which each polled cable modem is to be operated in and determine cable modems whose current geographic location is outside of their geographic radius.

18 Claims, 4 Drawing Sheets

TOPOGRAPHIC FRAUD DETECTION

BACKGROUND OF THE INVENTION

1. Field of the Invention

The present invention generally relates to cable networks and more specifically to detecting topographic fraud in cable networks.

2. Background Art

In cable networks, an end user typically subscribes to a paid cable service to access cable television broadcasts using a cable modem (CM) or a digital set top box (DSTB) that is specifically assigned to that end user. The assigned CM/DSTB is supposed to be operated by a user only on their premises. For example, a user is not supposed to use the CM/DSTB to access cable television broadcasts at the premises of an acquaintance. However, currently there is no method to detect whether a CM/DSTB is being operated by a user outside of their premises.

Methods and systems are needed to overcome this deficiency.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

Methods and systems for topographic fraud detection are described herein. In particular, methods and systems for detecting whether a cable modem is operating outside of its assigned geographic radius are described. According to an embodiment of the invention, cable modems on a network are periodically polled to determine their current location (a port that a cable modem is reporting in on), a billing database is accessed to determine an association between the cable modem and the user account and a geographic radius for each polled cable modem based on an associated billing address. A comparison is made to determine whether the current geographic location of the cable modem is outside of its assigned geographic radius. The examples described herein are directed towards determining whether a cable modem or a digital set top box is being operated outside of its assigned geographic radius. However, it is to be appreciated that the embodiments presented herein may also be used to detect other electronic devices that are being operated outside of their assigned geographic radius.

Embodiments are described that incorporate features of the invention. The described embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
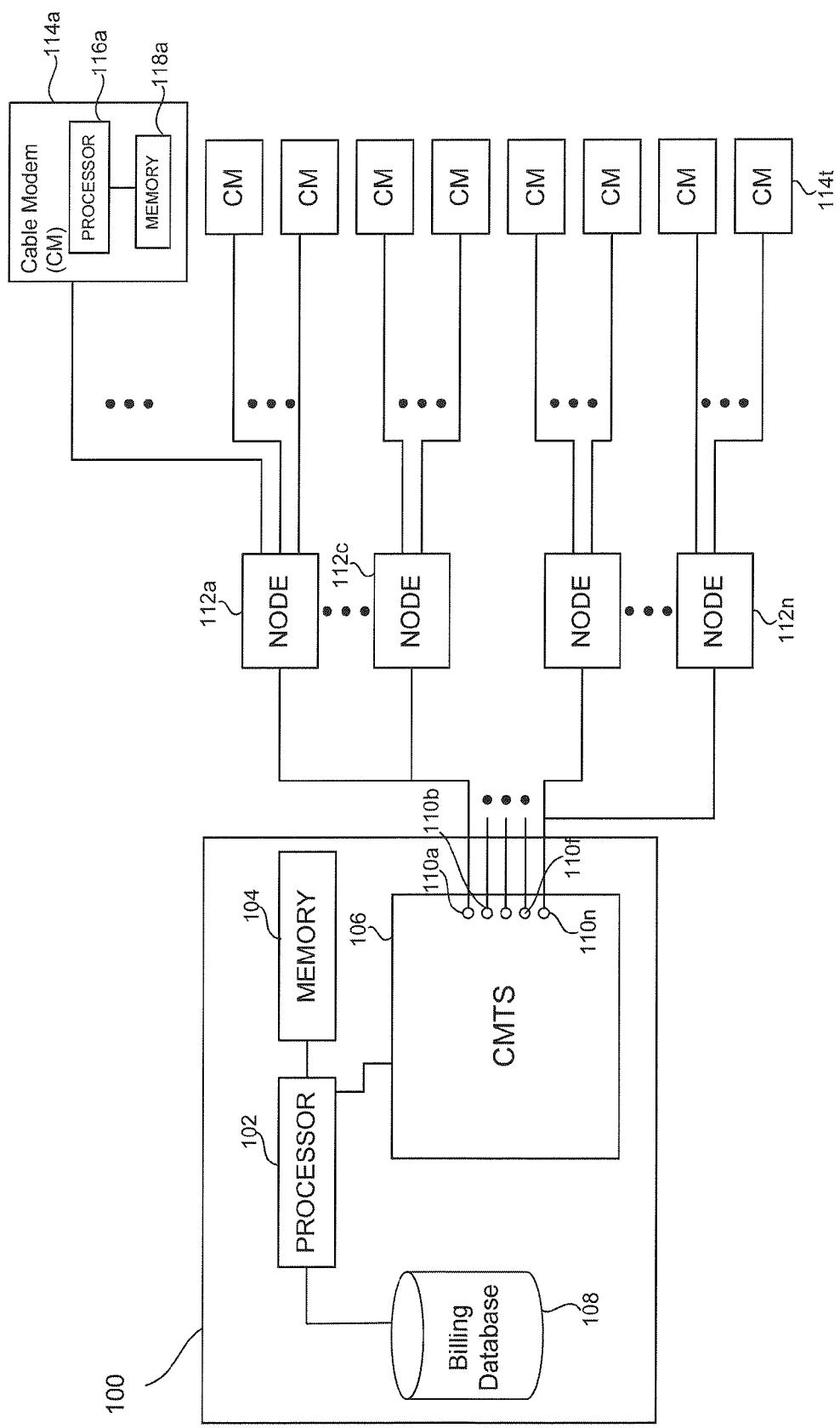
FIG. 1 illustrates an example system to detect topographic fraud according to an embodiment of the invention.

FIG. 1 illustrates an example system to detect topographic fraud according to an embodiment of the invention. A topographic fraud detection system (TFDS) 100 is coupled to one or more nodes 112a-m of a cable distribution system. Each of nodes 112a-m is coupled to one or more cable modems 114a-t. Topographic fraud detection system 100 includes a processor 102 coupled to a memory 104, a cable modem termination system (CMTS) 106 and a billing database 108. Cable modem termination system 106 includes a plurality of ports 110a-n. Ports 110a-n are physical hardware communication ports, that are typically part of a network card in cable modem termination system 106. Each of ports 110 is coupled to one or more nodes 112a-n. A port 110 may be coupled to multiple nodes 112, however each node 112 is coupled to only one port 110. Furthermore, each cable modem 114 can only be coupled to a single node 112 at a time. Each cable modem 114 may include a processor 116 coupled to a memory 118. Nodes 112 receive, for example, downstream optical signals from CMTS 106 via ports 110 and convert the optical signals into electrical signals that are transmitted to cable modems 114. Similarly, nodes 112 receive upstream electrical signals from cable modems 114 and convert them to optical signals that are transmitted to CMTS 106 via ports 110.

It is intended that each cable modem 114 be operated in a specific geographic area serviced by a specific port 110 based on its billing address. However, a user may physically move the cable modem 114 to another geographic area that is serviced by a different port 110. For example a user living in East Washington D.C. may take their cable modem 114 to a friend's house in West Washington D.C. Embodiments presented herein provide systems and methods to detect if a cable modem 114 is being operated outside of its assigned geographic area. The embodiments presented herein are described with respect to cable modems 114. However, it is to be appreciated that these embodiments are applicable to digital set top boxes as well.

In an embodiment, cable modem termination system 106 periodically polls cable modems 114a-t. For example, cable modem termination system 106 detects active cable modem 114a-t on its network and sends a Simple Network Management Protocol (SNMP) query to each such cable modem 114 detected on its network. In an example, "active" cable modems as referred to herein are cable modems 114 that are powered on and are in communication with CMTS 106. A "network" of a CMTS 106 as described herein includes nodes 112 and cable modems 114 that are coupled to that CMTS 106 via ports 110.

Figure 2:
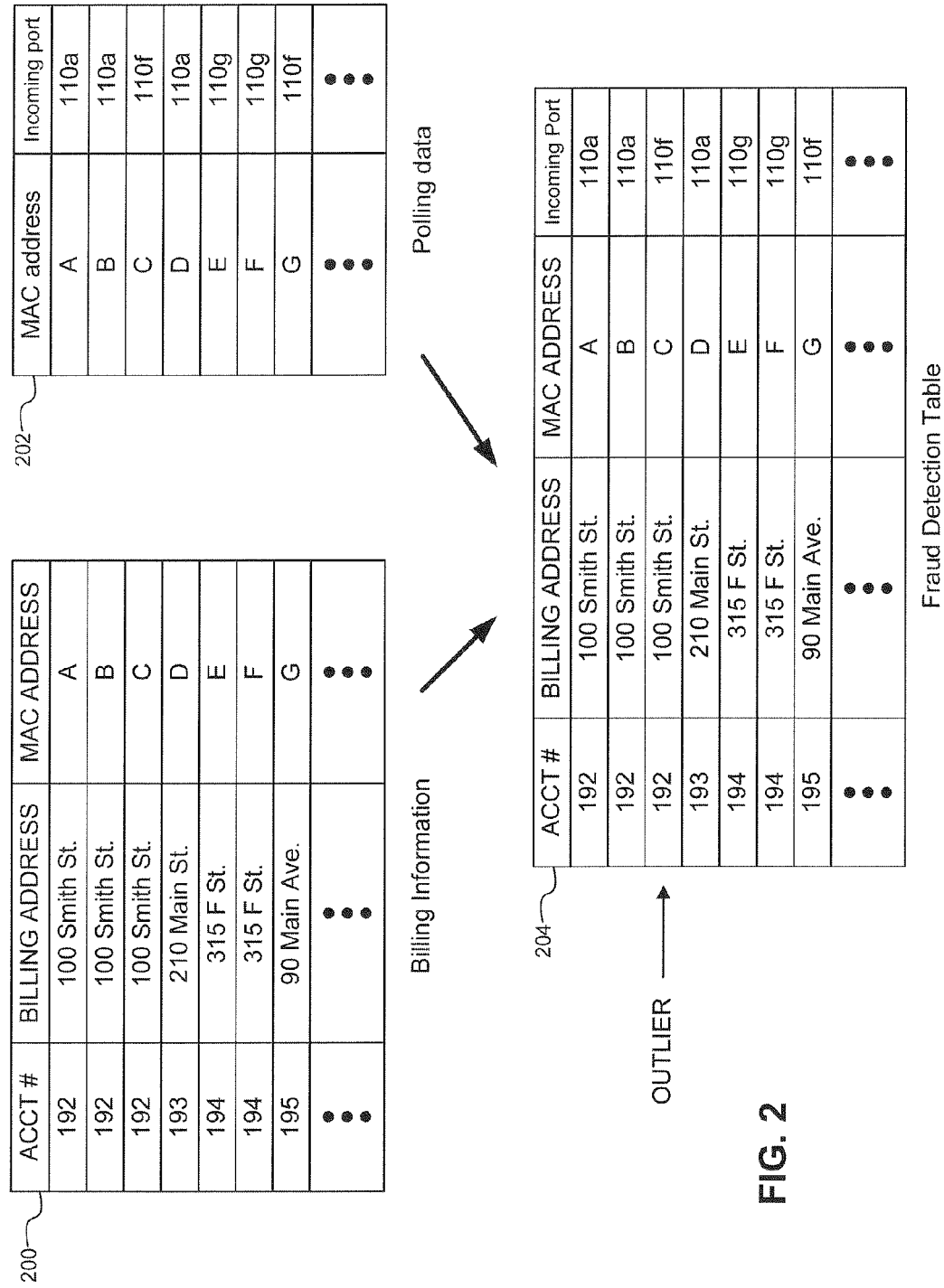
FIG. 2 illustrates example data structures to detect topographic fraud according to an embodiment of the invention.

In response to the SNMP query sent by CMTS 106, each active cable modem 114 sends an acknowledgment message back to CMTS 106 via a node 112 and corresponding port 110. The acknowledgment message sent by each cable modem 114*a-t* includes a media access control (MAC) address that is associated with the cable modem 114. The media access control address is unique to each cable modem 114. Based on the media access control address in the acknowledgement message, a cable modem termination system 106 can determine which port 110 a cable modem 114 is coupled to. CMTS 106 generates a "polling data" table 202 (see FIG. 2) that associates a MAC address of each active cable modem 114 with a port number through which that the cable modem 114 "reports in on." A port 110 that a cable modem 114 "reports in on" is a port 110 that receives a message from the cable modem 114 in response to the SNMP query. Since each port 110 services a specific geographic area, table 202 effectively provides an approximate "current geographic location" of each active cable modem 114 based on the port 110 they report in on. Processor 102, based on instructions in memory 104, receives polling data 202 from CMTS 106 and uses polling data 202 to determine a current geographic location for each cable modem 114.

Billing database 108 includes billing information table 200 that associates an account number for a customer with a Media Access Control (MAC) address for one or more cable modems assigned to that account number and a billing address associated with that account number. As seen in billing information table 200, a single account may be associated with multiple cable modems. For example, account number 192 is associated with three cable modems having respective MAC addresses A, B and C and a billing address of 100 Smith St. Account 193 is associated with a single cable modem with a MAC address D and a billing address 210 Main St. Account 194 is associated with two cable modems with respective MAC addresses E and F and a billing address of 315 F St. Account 195 is associated with a MAC address G and a billing address of 90 Main Ave.

In an example, processor 106 is configured to, based on billing information 200 and instructions in memory 104, determine a "geographic radius" or port 110 that a cable modem should report in on (also referred to herein as an "assigned port") based on the billing address associated with the account number for that cable modem 114. For example, based on the billing address for the cable modem 114 with MAC address A, processor 106 determines that the cable modem 114 with MAC address A should report in on port 110*a*. The port a cable modem 114 should report in on represents the geographic radius within which the cable modem 114 can operate. A geographic radius for a cable modem 114 includes all the nodes 112 that are coupled to a port 110 assigned to cable modem 114. For example, if cable modem 114*a* is assigned a port 110*a*, then cable modem 114*a* can operate in a geographic radius that is covered by nodes 112*a-c*.

Processor 106 determines which cable modems 114 have a current geographic location that is outside of their assigned geographic radius based on data from billing information table 200 and polling data table 202. Using the MAC address as a key, processor 106 generates a fraud detection table 204, based on billing information table 200 and polling data table 202. Fraud detection table 204 associates an account number, a MAC address and a billing address for each active cable modem 114 with a port 110 that the cable modem reports in on (incoming port). Based on the billing address associated with a cable modem 114, processor 102 determines whether the port 110 that the cable modem reported in on, is within the geographic radius for that cable modem. Cable modems with MAC addresses A, B and C should report in on, for example, assigned port 110*a* based on the billing address of 100 Smith St. associated with account number 192. As seen in fraud detection table 204, cable modems with MAC addressees A and B report in on port 110*a*. However the cable modem with MAC address C reports in on port 110*f*. Therefore, the cable modem with MAC address C is reporting in on a port (port 110*l*) that is outside of its geographic radius or assigned port (port 110*a*). Thus, processor 106 is configured to, based on instructions in memory 104, correlates a billing address associated with a cable modem 114 with a port 110 that the cable modem reports in on to determine whether the cable modem is operating outside of its assigned geographic radius. Processor 106, based on instructions in memory 104 compiles a list of cable modems 114 that are outside of their respective geographic radius. The list may be sent to a system (not shown) that sends a signal to shut down cable modems 114 that are operating outside of their assigned geographic radius.

Figure 3:
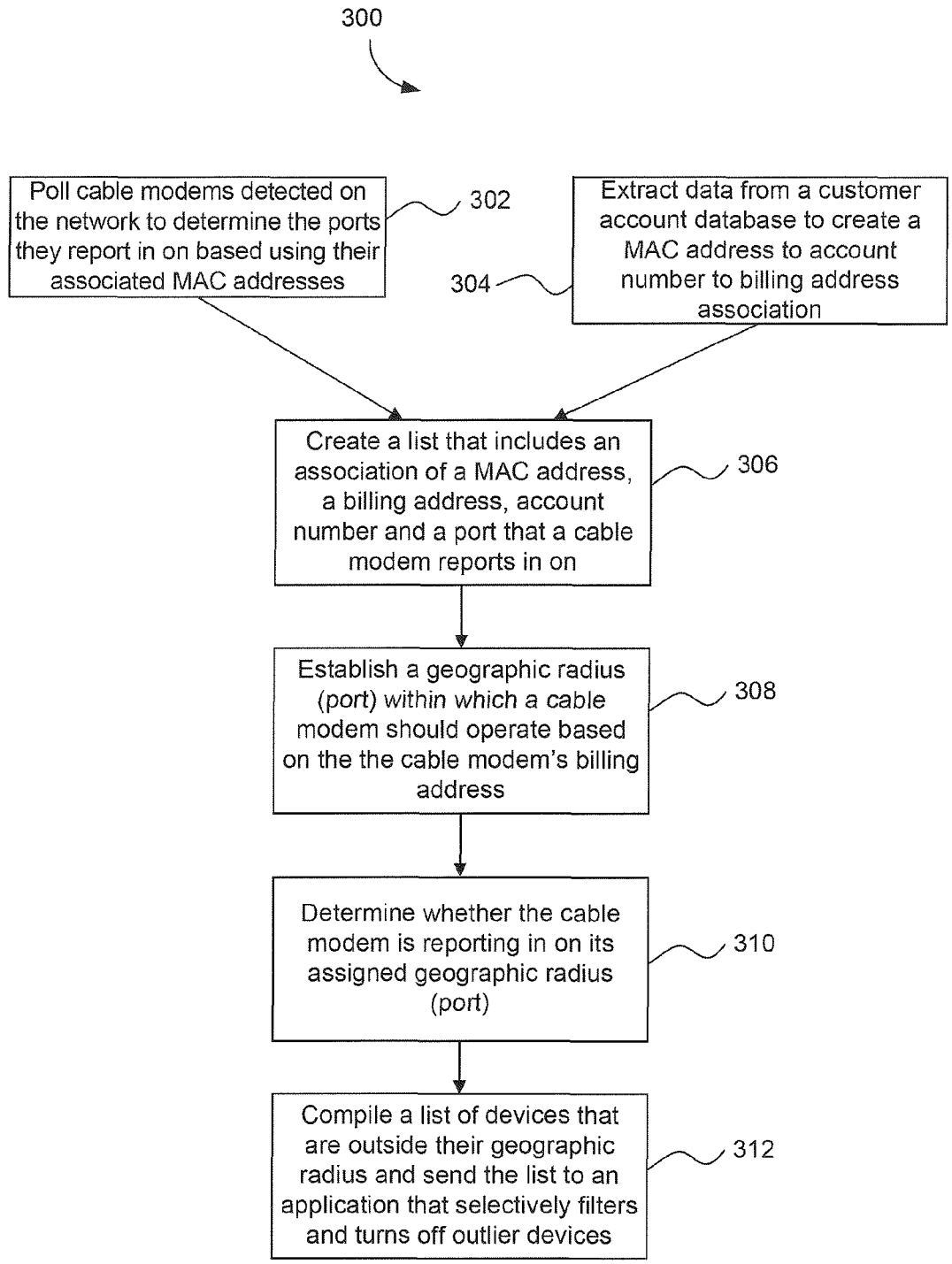
FIG. 3 is a flowchart describing an exemplary process performed by a topographic fraud detection system according to an embodiment of the invention.

FIG. 3 is a flowchart of an example process 300 depicting steps performed by TFDS 100 according to an embodiment of the invention. The steps of process 300 may be performed by, for example, processor 102 based on instructions stored in memory 104. In an alternative embodiment, the steps of process 300 may be performed by CMTS 106.

In step 302, active cable modems detected on a network are polled to determine a port that a cable modem reports. For example, cable modem termination system 106 sends an SNMP query to cable modem 114 and determines a port 110 that a cable modem 114 report in on based on the MAC address in an acknowledgment message received from the cable modem 114. Based on the port 110 that each active cable modem 114 reports in on, cable modem termination system 106 generates polling data table 202 which is used by processor 102 to determine a current geographic location of each active cable modem 114.

In step 304, a customer billing database is accessed to determine an association between an account number, a MAC address and a billing address for each cable modem. For example, processor 102 extracts data from billing database 108 to generate billing information table 200 that associates an account number with a MAC address and a billing address.

In step 306, a list is created that includes an association of a MAC address, billing address, an account number, and a port that a cable modem reports in on. For example, processor 106 based on polling data table 202 and billing information table 200 generates a fraud detection table 204 that associates an account number, a MAC address and a billing address with a port number that a cable modem reports in on.

In step 308, a geographic radius is determined within which a cable modem should be operated in based on the cable modem's billing address. For example, processor 106 based on a billing address from billing information table 200 determines a geographic radius or port that a cable modem should report in on.

In step 310, it is determined whether a cable modem is reporting in on its assigned port. For example, based on fraud detection list 204, processor 106 determines whether an incoming port for a cable modem 114 is the same as a port associated with its geographic radius.

In step 312, a list of cable modems that are outside of their geographic radius is compiled. For example, processor 102 compiles a list of cable modems that are reporting in on ports that are outside of their geographic radius. In an embodiment, the list is sent to a system that sends a signal to power down cable modems that are operating outside of their geographic radius.

The present invention, or portions thereof, can be implemented in hardware, firmware, software, and/or combinations thereof.

Figure 4:
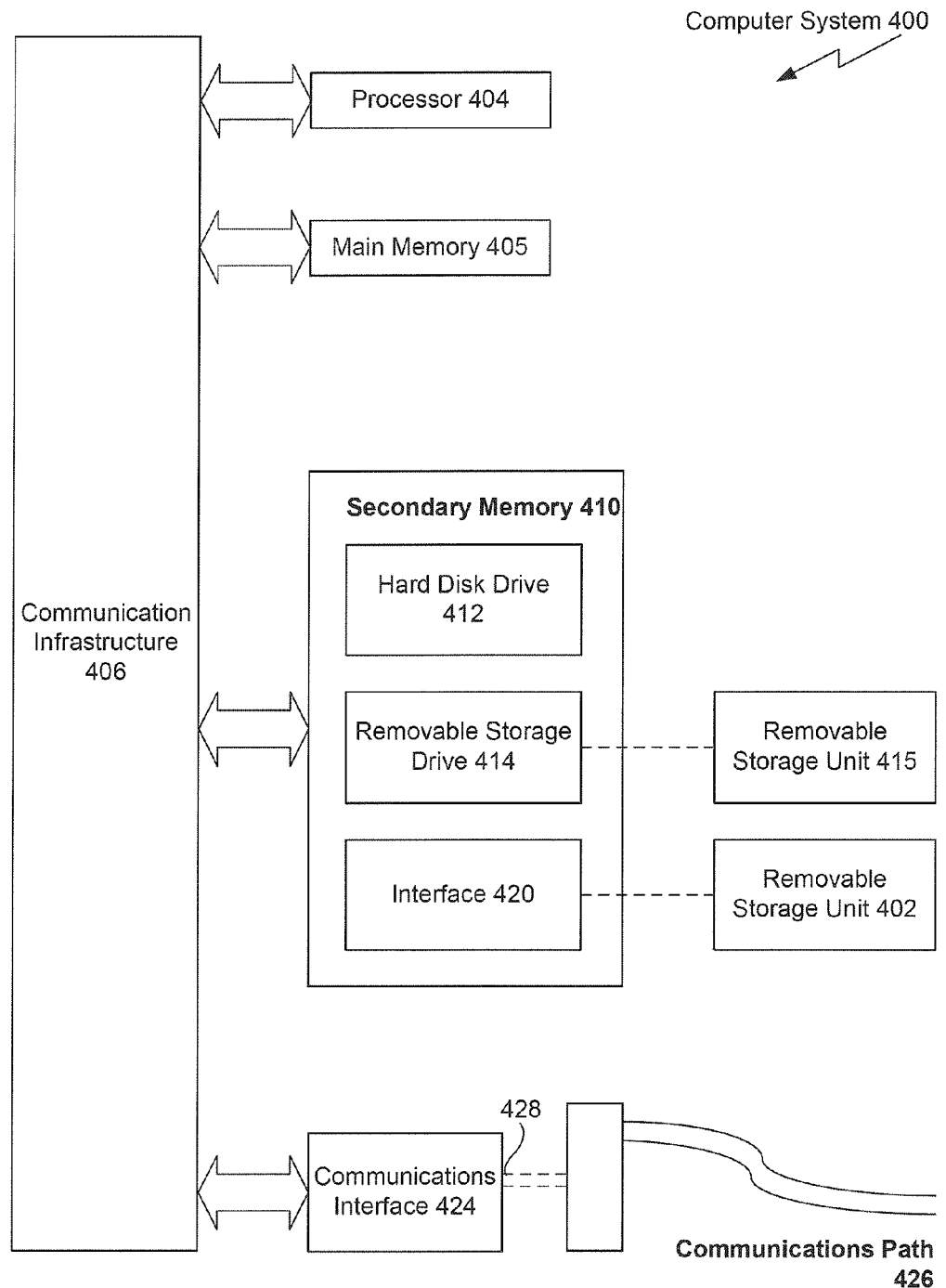
FIG. 4 is a block diagram of an exemplary computer system which can be used to implement the present invention.

The following description of a general purpose computer system is provided for completeness. The present invention can be implemented in hardware, or as a combination of software and hardware. Consequently, the invention may be implemented in the environment of a computer system or other processing system. An example of such a computer system 400 is shown in FIG. 4. The computer system 400 includes one or more processors, such as processor 404. Processor 404 can be a special purpose or a general purpose digital signal processor. The processor 404 is connected to a communication infrastructure 406 (for example, a bus or network). Various software implementations are described in terms of this exemplary computer system. After reading this description, it will become apparent to a person skilled in the relevant art how to implement the invention using other computer systems and/or computer architectures.

Computer system 400 also includes a main memory 405, preferably random access memory (RAM), and may also include a secondary memory 401. The secondary memory 410 may include, for example, a hard disk drive 412, and/or a removable storage drive 414, representing a floppy disk drive, a magnetic tape drive, an optical disk drive, etc. The removable storage drive 414 reads from and/or writes to a removable storage unit 415 in a well known manner. Removable storage unit 415, represents a floppy disk, magnetic tape, optical disk, etc. As will be appreciated, the removable storage unit 415 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 402 and an interface 420. Examples of such means may include a program cartridge and cartridge interface (such as that found in video game devices), a removable memory chip (such as an EPROM, or PROM) and associated socket, and other removable storage units 402 and interfaces 420 which allow software and data to be transferred from the removable storage unit 402 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCMCIA slot and card, etc. Software and data transferred via communications interface 424 are in the form of signals 428 which may be electronic, electromagnetic, optical or other signals capable of being received by communications interface 424. These signals 428 are provided to communications interface 424 via a communications path 426. Communications path 426 carries signals 428 and may be implemented using wire or cable, fiber optics, a phone line, a cellular phone link, an RF link and other communications channels.

The terms "computer program medium" and "computer usable medium" are used herein to generally refer to media such as removable storage drive 414, a hard disk installed in hard disk drive 412, and signals 428. These computer program products are means for providing software to computer system 400.

Computer programs (also called computer control logic) are stored in main memory 405 and/or secondary memory 410. Computer programs may also be received via communications interface 424. Such computer programs, when executed, enable the computer system 400 to implement the present invention as discussed herein. In particular, the computer programs, when executed, enable the processor 404 to implement the processes of the present invention. Where the invention is implemented using software, the software may be stored in a computer program product and loaded into computer system 400 using removable storage drive 414, hard drive 412 or communications interface 424.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A system to detect topographic fraud, comprising:
 a Cable Modem Termination System (CMTS) configured to poll a cable modem to generate polling data;
 a memory; and
 a processor coupled to the CMTS and the memory and configured to, based on instructions in the memory, determine a current geographic location for the polled cable modem based on the polling data from the CMTS, determine a geographic radius within which the polled cable modem is to be operated in, and determine whether the polled cable modem's current geographic location is outside of the geographic radius.

2. The system of claim 1, further comprising:
 a billing database coupled to the processor and configured to store an account number, a billing address and a Media Access Control (MAC) address for the cable modem;
 wherein the processor is configured to determine the geographic radius within which the cable modem is to be operated in based on a billing address associated with the cable modem.

3. The system of claim 1, wherein the current geographic location of the polled cable modem is determined based on a port of the CMTS that the cable modem reports in on.

4. The system of claim 3, wherein the processor identifies the cable modem, that reports in on the port of the CMTS, based on a Media Access Control (MAC) address associated with the cable modem.

5. The system of claim 1, wherein the CMTS is configured to poll the cable modem by sending a Simple Network Management Protocol (SNMP) query to the cable modem.

6. The system of claim 1, wherein the geographic radius for the cable modem is based on a port that the cable modem is assigned to report in on and wherein the port that the cable modem is assigned to report in on is based on a billing address associated with the cable modem.

7. The system of claim 1, wherein the geographic radius for the cable modem includes all nodes that are coupled to a port assigned to the cable modem.

8. The system of claim 1, wherein the processor is configured to, based on instructions in the memory, determine whether the cable modem's current geographic location is outside of the geographic radius based on a comparison of a billing address associated with the cable modem and a port that the cable modem reports in on.

9. The system of claim 1, wherein the processor is configured to, based on instructions in the memory, create a list of cable modems whose current geographic location is outside of their respective geographic radius.

10. A system to detect topographic fraud, comprising:
a Cable Modem Termination System (CMTS) configured to poll a cable modem and generate polling data;
a processor; and
a memory in communication with the processor, the memory for storing a plurality of instructions for directing the processor to:
determine a current geographic location for the polled cable modem based on the polling data;
determine a geographic radius within which the polled cable modem is to be operated; and
determine whether the cable modem's current geographic location is outside of the geographic radius.

11. The system of claim 10, farther comprising:
a billing database coupled to the processor and configured to store an account number, a billing address and a Media Access Control (MAC) address for the cable modem;
wherein the memory is configured to store instructions to direct the processor to determine the geographic radius within which the cable modem is to be operated in based on the billing address associated with the cable modem.

12. The system of claim 10, wherein the memory is configured to store instructions to direct the processor to determine the current geographic location of the polled cable modem based on a port of the CMTS that fled cable modem reports in on.

13. The system of claim 10, wherein the memory is configured to store instructions to direct the processor to identify the cable modem, that reports in on a port of the CMTS, based on a Media Access Control (MAC) address associated with the cable modem.

14. The system of claim 10, wherein the CMTS is configured to poll the cable modem by sending a Simple Network Management Protocol (SNMP) query to the cable modem.

15. The system of claim 10, wherein the geographic radius for the cable modem is based on a port that the cable modem is assigned to report in on and wherein the port that the cable modem is assigned to report in on is based on a billing address associated with an account number and a MAC address of the cable modem.

16. The system of claim 10, wherein the geographic radius for the cable modem includes all the nodes that are coupled to a port assigned to the cable modem.

17. The system of claim 10, wherein the memory is configured to store instructions to direct the processor to determine whether the cable modem's current geographic location is outside of the geographic radius by comparing a billing address associated with the cable modem and a port that the cable modem reports in on.

18. The system of claim 10, wherein the memory is configured to store instructions to direct the processor to create a list of cable modems whose current geographic location is outside of their respective geographic radius.

* * * * *

UNITED STATES PATENT AND TRADEMARK OFFICE
CERTIFICATE OF CORRECTION

| | | |
|---|---|---|
| PATENT NO. | : 8,601,523 B2 | Page 1 of 1 |
| APPLICATION NO. | : 12/858877 | |
| DATED | : December 3, 2013 | |
| INVENTOR(S) | : Michael Sellers | |

It is certified that error appears in the above-identified patent and that said Letters Patent is hereby corrected as shown below:

In the Claims:

Column 7, line 30, "farther comprising" should be replaced with --further comprising--.

Column 8, line 6, "that fled cable modem" should be replaced with --that the polled cable modem--.

Signed and Sealed this
Twenty-fifth Day of February, 2014

Michelle K. Lee
*Deputy Director of the United States Patent and Trademark Office*